United States Patent
Lu et al.

(10) Patent No.: US 11,490,240 B2
(45) Date of Patent: Nov. 1, 2022

(54) METHOD, SYSTEM AND DEVICE FOR SHARING INTELLIGENCE ENGINE BY MULTIPLE DEVICES

(71) Applicant: SAMSUNG ELECTRONICS CO., LTD., Suwon-si (KR)

(72) Inventors: Yanqing Lu, Beijing (CN); Quan Ma, Beijing (CN); Weixin Dong, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 51 days.

(21) Appl. No.: 16/986,891

(22) Filed: Aug. 6, 2020

(65) Prior Publication Data
US 2021/0044955 A1 Feb. 11, 2021

(30) Foreign Application Priority Data
Aug. 8, 2019 (CN) .......................... 201910728892.X

(51) Int. Cl.
*H04W 8/00* (2009.01)
*H04W 76/14* (2018.01)
(Continued)

(52) U.S. Cl.
CPC ........ *H04W 8/005* (2013.01); *G06F 16/9535* (2019.01); *G16Y 20/20* (2020.01);
(Continued)

(58) Field of Classification Search
CPC .... H04W 8/005; H04W 76/14; H04L 67/125; H04L 67/36; H04L 67/75; G06F 16/9535;
(Continued)

(56) References Cited

U.S. PATENT DOCUMENTS 10,665,238 B1 * 5/2020 Bermudez-Cisneros ................... G06F 3/167
10,776,170 B2 9/2020 Mora et al.
(Continued)

FOREIGN PATENT DOCUMENTS

CN 107452386 A 12/2017
CN 109712624 A1 5/2019
(Continued)

OTHER PUBLICATIONS

"Getting MAC address in Android 6.0", Stack Overflow, Oct. 15, 2015, 35 pages total, https://stackoverflow.com/questions/33159224/getting-mac-address-in-android-6-0/33165854.
(Continued)

*Primary Examiner* — Kristie D Shingles
(74) *Attorney, Agent, or Firm* — Sughrue Mion, PLLC

(57) ABSTRACT

A cloud server including a communication interface; and at least one processor configured to: detect a plurality of IoT devices connected to the cloud server from the communication interface, based on detecting the plurality of IoT devices connected to the cloud server, determine that the plurality of IoT devices are equipped with a corresponding plurality of intelligence engines, read and store a plurality of intelligence engine types of the plurality of intelligence engines, obtain a plurality of online states of the plurality of IoT devices, receive a search instruction sent from a receiving IoT device of the plurality of IoT devices, identify an instruction type of the search instruction, and store a correspondence between the instruction type and a preferred intelligence engine type, and select an IoT device based on the correspondence.

20 Claims, 13 Drawing Sheets

(51) Int. Cl.
  *G06F 16/9535* (2019.01)
  *G16Y 40/10* (2020.01)
  *G16Y 20/20* (2020.01)
  *H04L 67/125* (2022.01)
  *H04L 67/75* (2022.01)
  *G06F 3/16* (2006.01)
  *G10L 15/22* (2006.01)

(52) U.S. Cl.
  CPC ............ *G16Y 40/10* (2020.01); *H04L 67/125* (2013.01); *H04L 67/75* (2022.05); *H04W 76/14* (2018.02); *G06F 3/167* (2013.01); *G10L 15/22* (2013.01)

(58) Field of Classification Search
  CPC ......... G06F 3/167; G10L 15/22; G16Y 40/10; G16Y 20/20
  See application file for complete search history.

(56) References Cited

U.S. PATENT DOCUMENTS

| | | | |
|---|---|---|---|
| 2018/0293484 A1* | 10/2018 | Wang | G06F 16/638 |
| 2018/0301147 A1 | 10/2018 | Kim | |
| 2019/0034604 A1 | 1/2019 | Zheng et al. | |
| 2019/0074013 A1 | 3/2019 | Lawrence | |
| 2020/0213193 A1* | 7/2020 | Newell | H04W 8/18 |

FOREIGN PATENT DOCUMENTS

| | | |
|---|---|---|
| JP | 2018067302 A | 4/2018 |
| KR | 1020170103548 A | 9/2017 |
| WO | 2019103200 A1 | 5/2019 |

OTHER PUBLICATIONS

"How to get list of ALL apps (including System Apps)?", Stack Overflow, May 12, 2014, 5 pages total, https://stackoverflow.com/questions/23599550/how-to-get-list-of-all-apps-including-system-apps.

"Get Android Device Name [duplicate]", Stack Overflow, Aug. 15, 2011, 34 pages total, https://stackoverflow.com/questions/7071281/get-android-device-name.

"Numi 2.0 Intelligent toilet with Kohler Konnect", Kohler, Jul. 3, 2019, 3 pages total, https://www.us.kohler.com/us/Numi-2.0-Intelligent-toilet-with-KOHLER-Konnect/content/CNT134400007.htm.

Shannon Liao, "Simplehuman made a new mirror that can be both a lamp and Google Home speaker", The Verge, Jan. 7, 2019, 3 pages total, https://www.theverge.com/2019/1/7/18168476/simplehuman-sensor-mirror-hi-fi-assist-lamp-google-home-speaker-priceces-2019.

International Search Report (PCT/ISA/210) dated Nov. 20, 2020 issued by the International Searching Authority in International Application No. PCT/KR2020/010547.

Communication dated Jul. 15, 2022, issued by the European Patent Office in European Application No. 20850473.8.

* cited by examiner

FIG. 6

| Intelligent engine \ Device | speaker | TV | IPHONE | ANDROID phone | etc.. |
|---|---|---|---|---|---|
| SIRI | N | N | Y | N | |
| GOOGLE ASSISTANT | N | Y | N | N | |
| AMAZON ALEXA | Y | N | N | N | |
| SAMSUNG BIXBY | N | N | N | Y | |
| BALDU AI | N | N | N | N | |
| ... | | | | | |

FIG. 8

| Device\capability | Smart speaker | TV | Mobile phone | watch | refrigerator | selection |
|---|---|---|---|---|---|---|
| Mobile phone | N | N | Y | Y | Y | GOOGLE |
| music | Y | Y | Y | N | Y | ALEXA |
| movie | N | Y | Y | N | N | GOOGLE |
| shopping | N | Y | Y | N | Y | BIXBY |
| information search | Y | Y | Y | N | Y | SIRI |
| Cloud service | Y | Y | Y | N | N | BIXBY |
| map | N | Y | Y | Y | Y | BIXBY |
| mail | N | Y | Y | N | Y | GOOGLE |
| calendar | Y | Y | Y | Y | Y | GOOGLE |
| translation | Y | Y | Y | Y | Y | BIXBY |
| E-book | N | Y | Y | N | N | SIRI |
| Audiobook | Y | Y | Y | N | N | SIRI |
|  |  |  |  |  |  | ALEXA |

METHOD, SYSTEM AND DEVICE FOR SHARING INTELLIGENCE ENGINE BY MULTIPLE DEVICES

CROSS-REFERENCE TO RELATED APPLICATION

This application is based on and claims priority under 35 U.S.C. § 119 to Chinese Patent Application No. 201910728892.X, filed on Aug. 8, 2019, in the China National Intellectual Property Administration, the disclosure of which is incorporated by reference herein in its entirety.

BACKGROUND

1. Field

The disclosure relates to intelligent network technologies, and in particular, to a method, a system and a device for sharing an intelligence engine by multiple devices.

2. Description of Related Art

With the rise and popularity of devices equipped with artificial intelligence (AI) intelligence engines, which may include APPLE SIRI, SAMSUNG BIXBY, AMAZON ALEXA, and GOOGLE ASSISTANT, there may be cases where devices with different intelligence engines are online at the same time in a smart home or in a same network, for example a Local Area Network (LAN). At present, it may only be possible to use, on an APPLE mobile phone, the SIRI intelligence engine that comes with the APPLE mobile phone. Similarly, when an intelligence engine service is used on a SAMSUNG television (TV) equipped with the SAMSUNG BIXBY intelligence engine, it may only be possible to use the BIXBY that comes with the TV.

Each company's intelligence engine system has its own characteristics and limitations, as well as different user preferences. For example, user A likes contents searched out by the GOOGLE searching engine, while for the playback of music tracks, prefers contents searched out by the AMAZON ALEXA; user B likes to use the GOOGLE searching engine, however, a result searched out using Siri searching engine of the APPLE mobile phone by user B every time is not what user B wants.

Currently, different AI intelligence engine systems are deployed in respective product devices. When using an APPLE mobile phone, an intelligence engine system used by the user is only SIRI, and a SAMSUNG product uses the BIXBY intelligence engine system, as shown in FIG. 1. For different using preferences of users, it is difficult to solve the customized use of various intelligence engines at this stage.

SUMMARY

Provided are a method, a system and a device for sharing an intelligence engine by multiple devices, in which advantages of intelligence engines in the multiple devices can be complemented with each other, and the accuracy of the user instruction can be optimized.

In accordance with an aspect of the disclosure, a method for sharing an intelligence engine by multiple devices includes, based on a system detecting a plurality of Internet of Things (IoT) devices connected is connected to the system, determining, by the system, that the plurality of IoT devices are equipped with a corresponding plurality of intelligence engines, reading and storing a plurality of intelligence engine types of the plurality of intelligence engines, and obtaining a plurality of online states of the plurality of IoT devices; based on a receiving IoT device from among the plurality of IoT devices receiving a search instruction from a user; sending, by the receiving IoT device, the search instruction to a cloud server of the system for identifying an instruction type of the search instruction, and sending, the received search instruction to a selected IoT device, wherein the selected IoT device includes a preferred intelligence engine having an intelligence engine type corresponding to the instruction type of the search instruction; and processing, by the selected IoT device, the received search instruction using the preferred intelligence engine.

After processing, by the selected IoT device, the received search instruction using the preferred intelligence engine, the method may further include receiving, by the selected IoT device, a search result from the preferred intelligence engine; and according to at least one of a correspondence between the instruction type of the search instruction and an output device, or an instruction of a user, sending the search result to a corresponding output device for subsequent processing.

The method may further include acquiring, by the system, capability information of the plurality of IoT devices, and determining the correspondence between an instruction type and the output device based on the capability information.

Based on the plurality of IoT devices including clients of the system, the plurality of intelligence engine types, the plurality of online states, and the capability information, may be obtained using the client, and are registered at a cloud; and based on the plurality of IoT devices not including the clients of the system, the system may be further configured to connect to the plurality of IoT devices through Bluetooth to obtain device names of the plurality of IoT devices, and to search a preset correspondence table between the device names and the plurality of intelligence engine types and the capability information.

The instruction type may correspond to one or more of the intelligence engine types, and the one or more of the intelligence engine types may have different priorities.

The correspondence between the instruction type and the intelligence engine type may be specified by a user; and after sending the search instruction to the selected IoT device, the method may further include increasing a priority of the preferred intelligence engine.

The received search instruction may be sent directly to the selected IoT device, so that the first IoT device parses the received search instruction, or the received search instruction may be parsed before being sent to the selected IoT device.

Based on the search instruction being voice data of a user, the parsing of the received search instruction may include performing speech recognition and semantic understanding on the voice data of the user.

The selected IoT device may directly parse the received search instruction, or send the instruction to the cloud server for parsing.

The received search instruction may be sent to the selected IoT device through end-to-end transmission or through a smart system cloud used as an intermediary.

In accordance with an aspect of the disclosure, a system for sharing an intelligence engine by multiple devices includes a cloud server; and a plurality of Internet of Things (IoT) devices; wherein the cloud server is configured to: based on detecting that the plurality of IoT devices are connected to the cloud server, determine that the plurality of IoT devices are equipped with a corresponding plurality of intelligence engines, read and store a plurality of intelligence engine types of the plurality of intelligence engines, obtain a plurality of online states of the plurality of IoT devices, send the plurality of online states and the plurality of intelligence engine types to the plurality of IoT devices, receive a search instruction sent from a receiving IoT device from among the plurality of IoT devices, and identify an instruction type of the search instruction, and wherein the receiving IoT device is configured to: based on receiving the search instruction from a user, send the search instruction to the cloud server for identifying the instruction type of the search instruction, send, the received search instruction to a selected IoT device, wherein the selected IoT device includes a preferred intelligence engine having an intelligence engine type corresponding to the instruction type, and process a search instruction sent from another IoT device or the cloud server in an intelligence engine of the receiving IoT device.

In accordance with an aspect of the disclosure, a cloud server includes an information obtaining unit; a type identifying unit; and a processing device determining unit; wherein the information obtaining unit is configured to, based on detecting a plurality of IoT devices connected to the cloud server, determine that the plurality of IoT devices are equipped with a corresponding plurality of intelligence engines, read and store a plurality of intelligence engine types of the plurality of intelligence engines, obtain a plurality of online states of the plurality of IoT devices; wherein the type identifying unit is configured to receive a search instruction sent from a receiving IoT device, identify an instruction type of the search instruction, and return the instruction type of the search instruction to a selected IoT device; and wherein the processing device determining unit is configured to store a correspondence between the instruction type and a preferred intelligence engine type, and select the selected IoT device based on the correspondence.

The cloud server may further include: a capability information obtaining unit configured to acquire capability information of the plurality of IoT devices, determine a correspondence between an instruction type and an output device according to the capability information, and store the correspondence between the instruction type and the output device in the processing device determining unit; wherein the processing device determining unit is configured to determine the selected IoT device corresponding to the received search instruction according to the correspondence, and inform the receiving IoT device.

The cloud server may further include: a correspondence updating unit configured to increase a priority score of the preferred intelligence engine type according to a set step size after determining the selected IoT device, and update the correspondence between the instruction type and the intelligence engine type in real time according to the priority score of the preferred intelligence engine type.

In accordance with an aspect of the disclosure, an IoT device in a smart home system, includes a user interface unit; a server interface unit; and an intelligence engine, wherein, the user interface unit is configured to receive a search instruction input by a user, wherein the server interface unit is configured to: send the search instruction to a cloud server of the smart home system for identifying an instruction type of the search instruction, receive processing device information returned by the cloud server, and send the search instruction to a preferred intelligence engine of a processing device corresponding to the processing device information, wherein the intelligence engine is configured to process a search instruction received by the intelligence engine.

The server interface unit may be further configured to receive output device information of the search instruction from the cloud server, and to send the output device information and the search instruction to the preferred intelligence engine of the processing device, and the intelligence engine may be configured to send a search result of the intelligence engine to an output device corresponding to the output device information for subsequent processing.

The user interface unit may be configured to receive output device information specified by the user, and the intelligence engine may be configured to send a search result of the intelligence engine to an output device corresponding to the output device information for subsequent processing.

BRIEF DESCRIPTION OF THE DRAWINGS

FIG. 6 is a schematic diagram illustrating an intelligence engine type when multiple devices are registered in a smart home, according to an embodiment;

FIG. 8 is a schematic diagram illustrating a correspondence between a main capability list of an Internet of Things (IoT) device and a preferred intelligence engine, according to an embodiment;

DETAILED DESCRIPTION

In order to make the objects, technical solutions and advantages of the present disclosure more comprehensible, embodiments will be further described below in detail with reference to the accompanying drawings.

Figure 1:
FIG. 1 is a schematic diagram illustrating that a user may only use an intelligence engine provided by a device, according to an embodiment.
Figure 2:
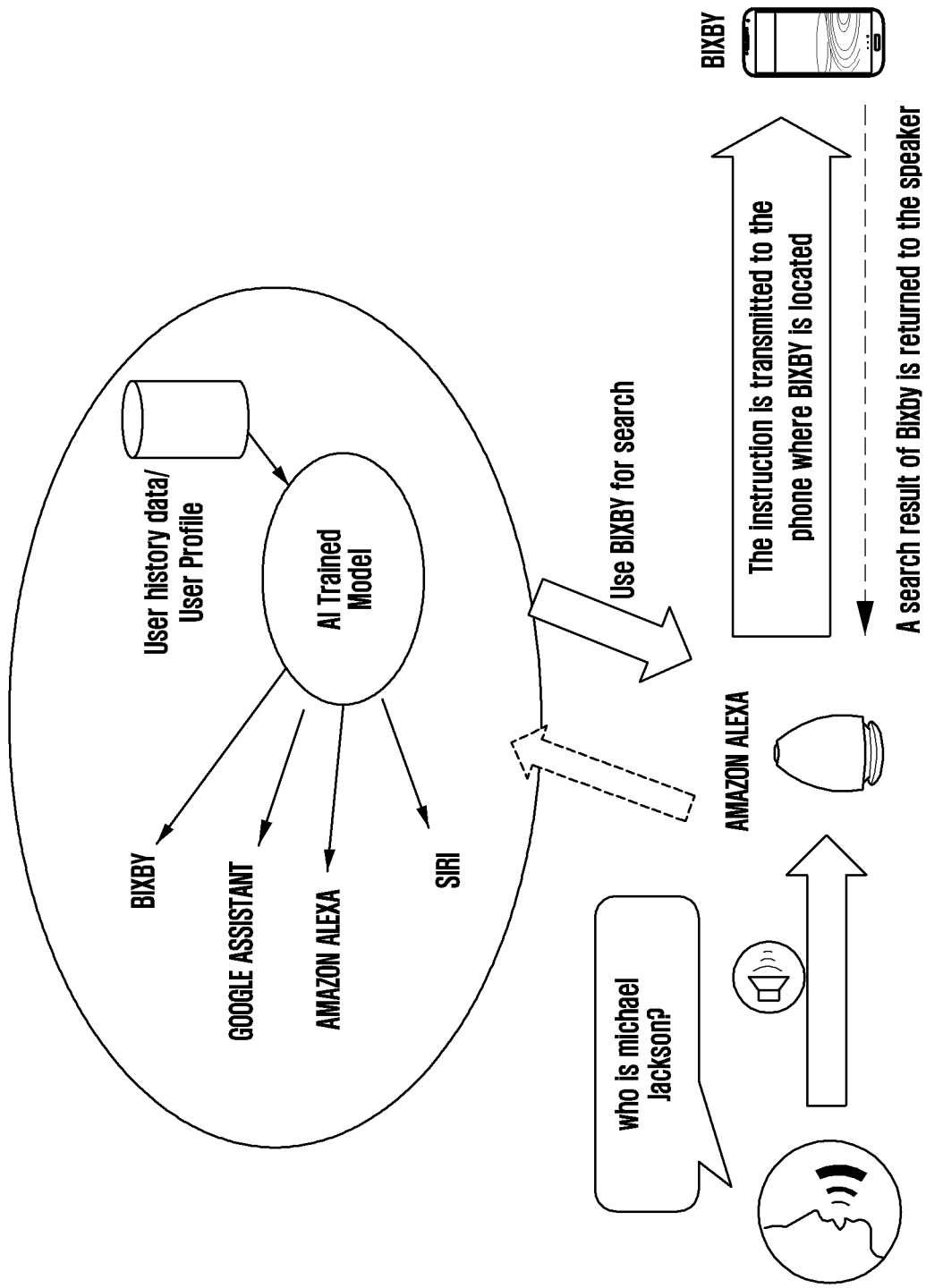
FIG. 2 is a schematic diagram illustrating the BIXBY intelligence engine of a mobile phone being used by an intelligent speaker searching command, according to an embodiment.

At present, different AI intelligence engine systems are deployed in their respective product devices and may not be shared. Thus, the use of an intelligence engine has limitations. When user B searches using an APPLE terminal, a TV or another device with the GOOGLE intelligence engine is also online at the same time, a sharing mechanism between intelligence engine systems may bring great convenience to the user and improve user's experience with a smart home, as shown in FIG. 2. In the smart home environment, different instructions of the user, for example the voice search command "Who is Michael Jackson?" spoken by user B, may be processed by different intelligence engines, which may greatly enrich the user's preference and improve the smart convenience of the smart home.

Figure 3:
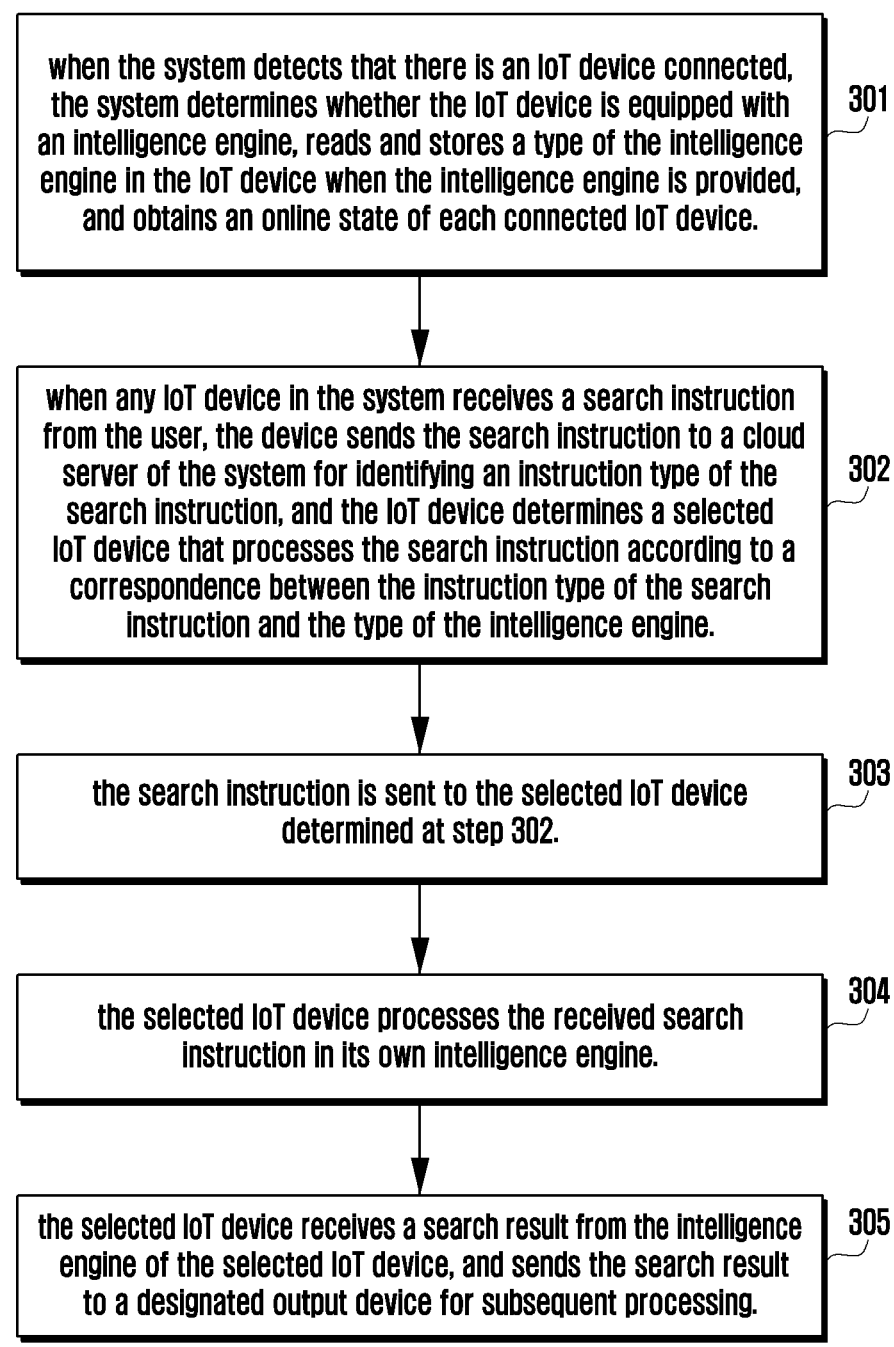
FIG. 3 is a schematic flowchart illustrating a basic process of a method for sharing an intelligence engine by multiple devices, according to an embodiment.

Based on the above idea of sharing an intelligence engine, the present disclosure provides a method for sharing an intelligence engine. FIG. 3 is a schematic flowchart illustrating an embodiment of such a method. A smart home system managed for example by a SMART THINGS system is taken as an example for description.

At operation 301, when the system detects that there is an Internet of Things (IoT) device connected, the system determines whether the IoT device is equipped with an intelligence engine, reads and stores a type of the intelligence engine in the IoT device when the intelligence engine is provided, and obtains an online state of each connected IoT device.

Figure 4:
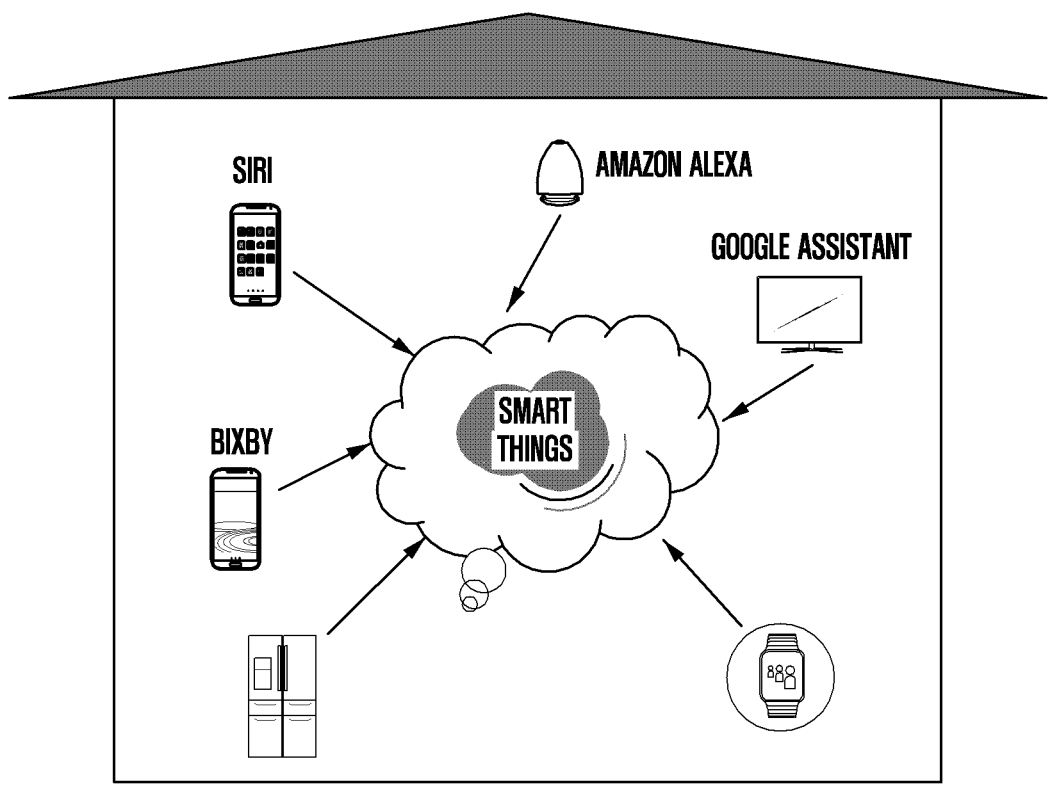
FIG. 4 is a schematic diagram illustrating connection registration of devices in a smart home system, according to an embodiment.

When the smart home system detects that there is an IoT device connected, the smart home system determines whether the device is equipped with an intelligence engine and a type of the intelligence engine. An embodiment of a schematic diagram of connection registration is shown in FIG. 4.

In addition, in order to automatically select a final output device for a searching result more intelligently, the smart home system may further acquire a capability information list of each IoT device when acquiring the type of the intelligence engine. This information may be, for example, actively acquired by the system or actively provided by the device. For example, a TV may be provided with functions of displaying and playing media, a mobile phone may be provided with a function of making a call, a speaker may not be provided with a display function, etc. Registration of various functions of smart devices may determine selection of the final output device. For example, if a smart TV is not provided with the function of making a call, then a user's instruction of, for example, "Make a call with Xiao Ming" may not be transmitted to the smart TV for processing.

Specifically, when the system acquires and detects the current online condition, the type of the intelligence engine, and the capability information of the device, different acquisition and detection modes may be adopted according to types of different devices.

For example, if there is a system client on the IoT device (for example, installing a specific app or application), the client may detect an engine type of the IoT device, obtain an online state of the device, and register corresponding information at a cloud. A client such as an application may not be directly installed on some devices such as an AMAZON smart speaker. For such IoT device that does not have a system client, the system may connect the IoT device through Bluetooth to obtain a device name of the corresponding device, and search a preset correspondence table between a device name and an intelligence engine type/capability information to determine an intelligence engine type and/or capability information of the corresponding IoT device.

Figure 5:
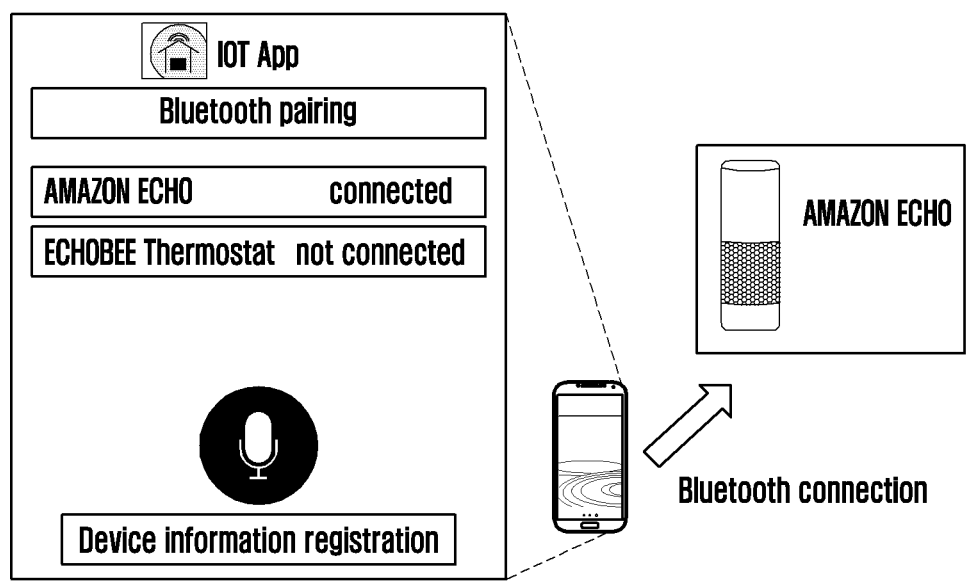
FIG. 5 is a schematic diagram illustrating BLUETOOTH connection of an application and an embedded device, according to an embodiment.

In more detail, taking an installed application as a system client as an example, for an IoT device where an application may be installed, device information and a running process may be detected during development of the application, and a type of an AI engine is determined according to a keyword. After obtaining such device information, the device is registered at the cloud. For an IoT device, for example a smart thermostat such as an ECOBEE thermostat, or a smart toilet, where an application may not be directly installed for detection of device information, the device may be connected through Bluetooth. After obtaining a device name of the device, a preset device name-capability information table is searched to obtain device capability information and a type of an A engine corresponding to the device name. An example of such a Bluetooth connection is shown in FIG. 5, as a connection between a mobile device and an AMAZON ECHO device.

A diagram of an example of the preset device name-capability information table discussed above is illustrated in FIG. 6.

At operation 302, when any IoT device in the system receives a search instruction from the user, the device sends the search instruction to the system, for example to a cloud server of the system, for identifying an instruction type of the search instruction, and the IoT device determines a first IoT device that processes the search instruction according to a correspondence between the instruction type of the search instruction and the type of the intelligence engine.

The first IoT device may be an online IoT device where the intelligence engine corresponding to the instruction type of the search instruction is located.

The correspondence between the instruction type of the search instruction and the type of the intelligence engine may be configured in advance. The search instruction may be sent to the corresponding intelligence engine for search processing according to the correspondence.

Figure 7:
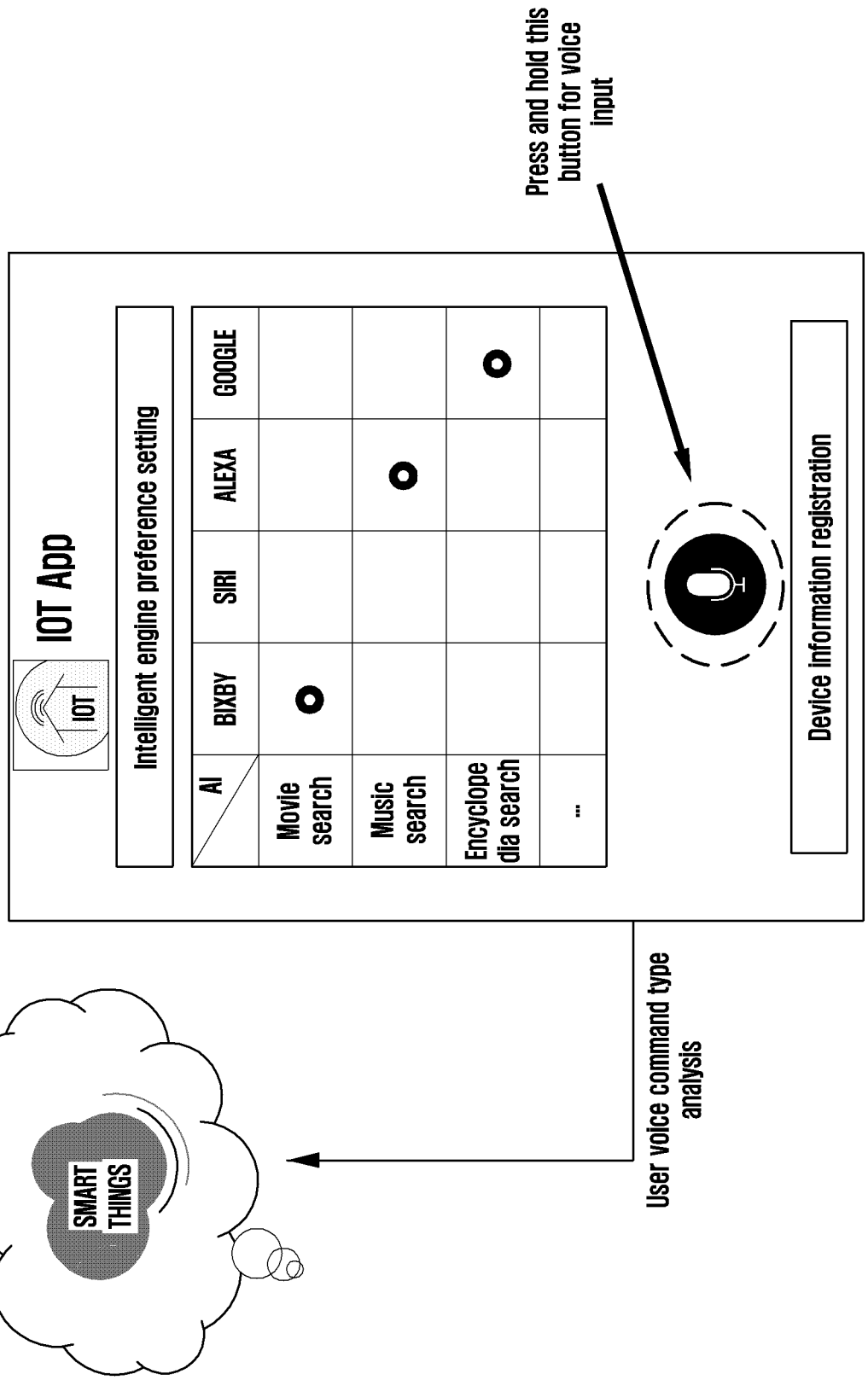
FIG. 7 is a schematic diagram illustrating performing instruction type detection by a user voice at the cloud, according to an embodiment.
Figure 9:
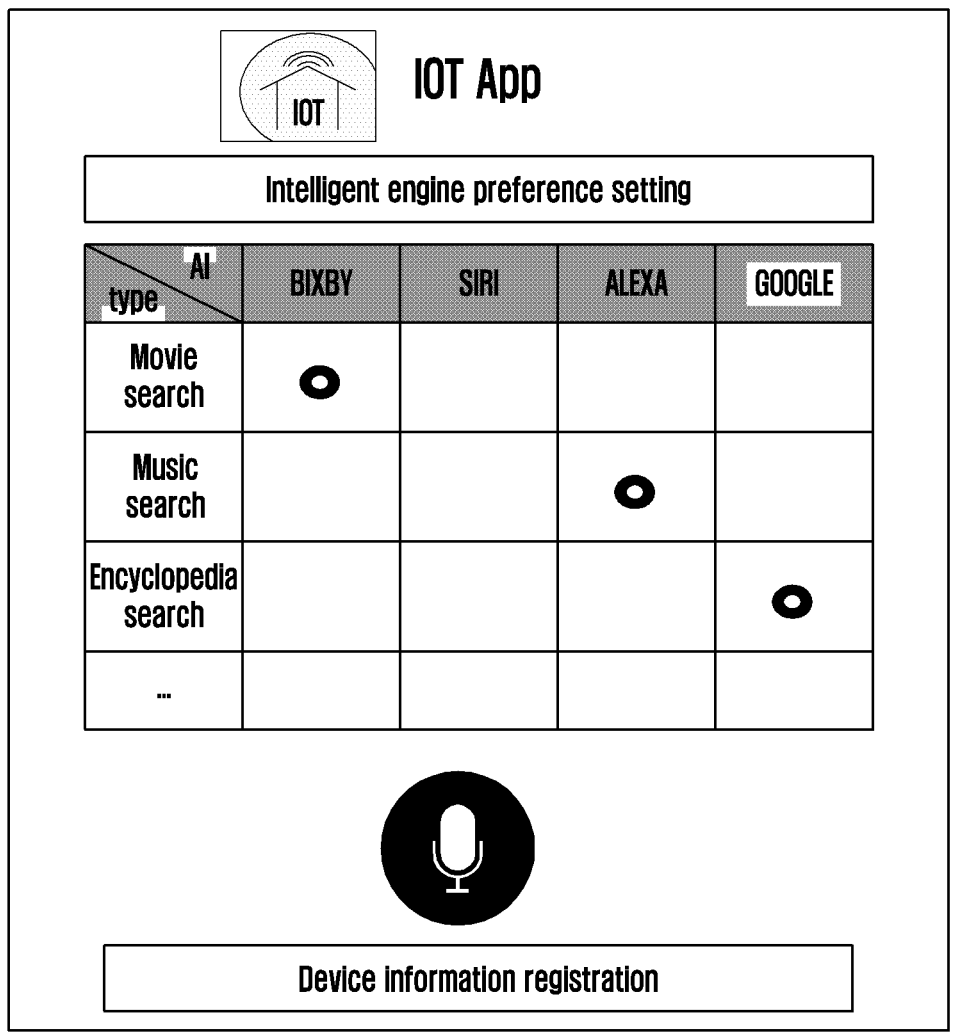
FIG. 9 is a schematic diagram illustrating engine preference settings on an IoT application, according to an embodiment.

In an embodiment, the determination of the instruction type may be that a user voice is sent to the cloud for detecting a type of a user instruction, for example an information search, a movie search, a music search, etc., as shown in FIG. 7. The instruction type and the intelligence engine may be a one-to-one relationship or a one-to-many relationship. In the one-to-many relationship, the instruction type corresponds to multiple intelligence engines, and there are priority differences among the multiple intelligence engines. The correspondence between the instruction type and the intelligence engine may be specified by the user, or may be calculated by the intelligence engine based on historical data, or may be a combination thereof. For example, an initial correspondence may be specified by the user, and the correspondence may be adjusted in real time according to historical data. A schematic diagram illustrating an example of a correspondence between a main capability list of an IoT device and a preferred intelligence engine may be shown in FIG. 8. An example of engine preference settings on an IoT application may be shown in FIG. 9.

When the correspondence between the instruction type and the intelligence engine is calculated according to the historical data, a score of priority of an intelligence engine on the first IoT device that processes the search instruction may be adjusted after the first IoT device to which the search instruction is sent is determined each time. For example, when configuring the correspondence between the instruction type of "play and search music," and the intelligence engines, ALEXA may have an initial score of 50 points, GOOGLE ASSISTANT may have an initial score of 40 points, and BIXBY may have an initial score of 10 points.

Accordingly, ALEXA has the highest priority and is most likely to be selected as a search engine for music playback. If ALEXA is successfully selected by the user for one time, such selection may give ALEXA an increase of 2 points, from a score of 50 points to a score of 52 points, while GOOGLE ASSISTANT and BIXBY are each decreased by 1 point, from a score of 40 points to a score of 39 points, and from a score of 10 points to a score of 9 points, respectively. After a period of use, the score preference may record a preferred intelligence engine that the user is accustomed to, so as to select a suitable intelligence engine more intelligently. If the user believes that a GOOGLE service is improving, frequent use of the GOOGLE service may increase a preference score of GOOGLE and increase a chance of GOOGLE being selected.

According to the above example, when a certain amount of usage data including user's habits is accumulated for a period of time, an intelligent algorithm of the smart home may optimize and adjust a priority order of the instruction and the intelligence engine, and may dynamically adjust according to the usage habits more intelligently and efficiently.

At operation 303, the search instruction is sent to the selected IoT device determined at operation 302.

When the search instruction is sent, the received search instruction is directly sent to the selected IoT device and the selected IoT device parses the search instruction; alternatively, the received search instruction is parsed and then sent to the selected IoT device.

For example, what is transmitted may be voice pulse-code modulation (PCM) data of the user, or may be instruction information parsed through a receiving intelligence engine, which may refer to an intelligence engine configured on a device which receives the search instruction input by the user. In other words, the operation of parsing and semantic understanding of the user's voice instruction may be performed at the receiving intelligence engine or at the intelligence engine on the selected IoT device.

The instruction parsing performed at the IoT device may be performed at an offline on-chip device, or uploaded to a corresponding back-end cloud server for processing. The offline on-chip device is faster and does not rely on the network, but a recognition result is not as good as the cloud server.

In an embodiment, the instruction may be transmitted between devices through end-to-end transmission.

For example, the smart home system may record a Mac address and an IP address of a target device, and may perform end-to-end connection, sending and receiving. The instruction may be in a voice format, i.e., a PCM format or a MP3 format. Alternatively, the instruction may be a text instruction parsed through automatic speech recognition (ASR).

In an embodiment, the instruction may be transmitted between devices through smart home cloud transmission.

Figure 10:
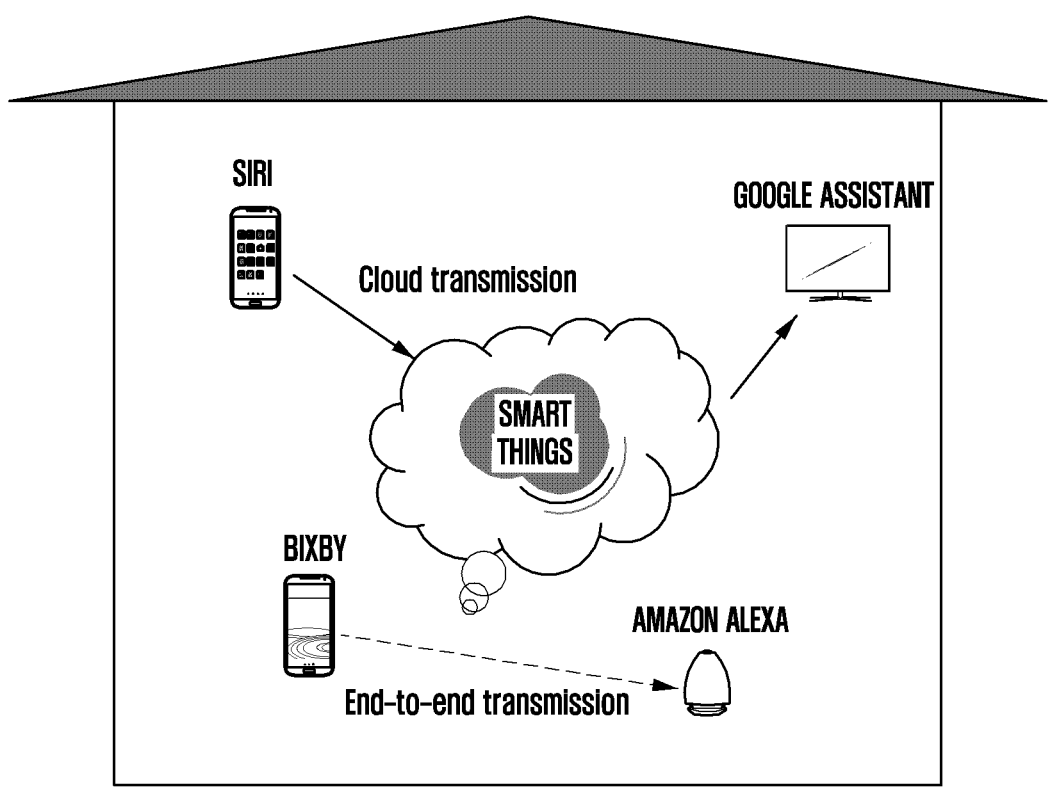
FIG. 10 is a schematic diagram illustrating transmission of a searching instruction between two IoT devices, according to an embodiment.

Compared with the end-to-end transmission mode, the cloud transmission may mean that a smart home cloud is used as an intermediary, and all of operations, transmission and interaction between devices are implemented through the cloud, as shown in FIG. 10.

At operation 304, the selected IoT device processes the received search instruction in its own intelligence engine.

Figure 11:
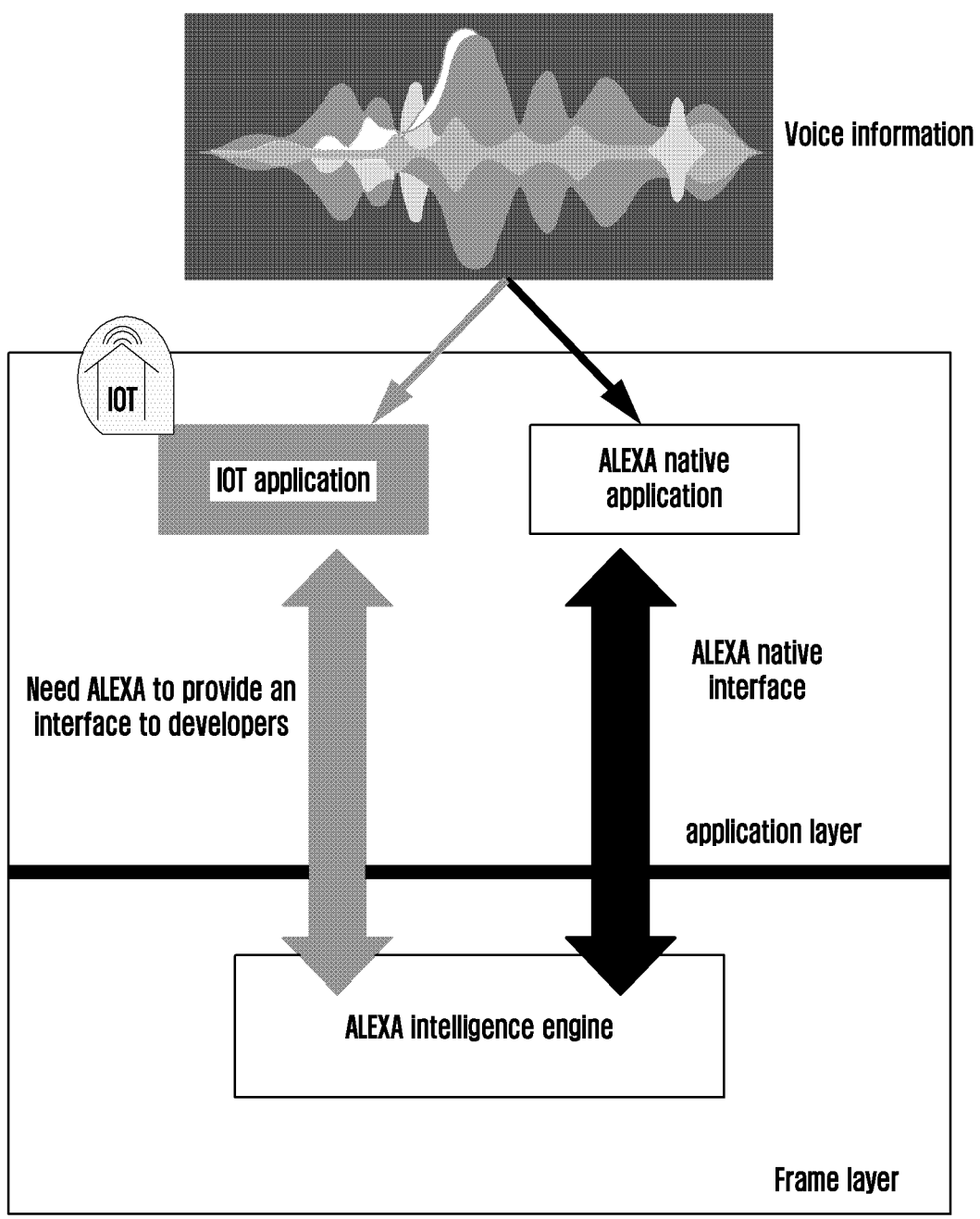
FIG. 11 is a schematic diagram illustrating command processing performed by a device where a preferred AI engine is located, according to an embodiment.

When the device, for example the selected IoT device, where the preferred AI engine is located is online, the user voice may be sent to the device. The device may enable its own AI engine system to process the user voice instruction, as shown in FIG. 11. At this stage, major voice AI companies, for example AMAZON, GOOGLE, and BIXBY, have opened SDK development kits for third-party developers. In the future, an operating system, for example a GOOGLE ANDROID operating system may encapsulate an interface of the AI engine at a Framework layer, which may simplify the use of this operation.

In embodiments, the method may end here, or additional operations may be performed.

For example, operation 305, the selected IoT device receives a search result from the intelligence engine of the selected IoT device, and sends the search result to a designated output device for subsequent processing.

The specific designated device may be an output device specified by the user, or may be an output device determined according to the correspondence between the instruction type of the search instruction and the output device.

Specifically, the designated output device may include, but is not limited to, a terminal or IoT device that originally receives the user instruction. For example, may instruct a mobile phone to open a video application to play a movie. After processing through an intelligence engine, if the TV is found to be connected, the movie may be played directly through the TV terminal device instead of the original mobile phone. The final device terminal for display or playback may be selected by the user, or may be automatically selected by an intelligent algorithm according to historical user habits.

Figure 12:
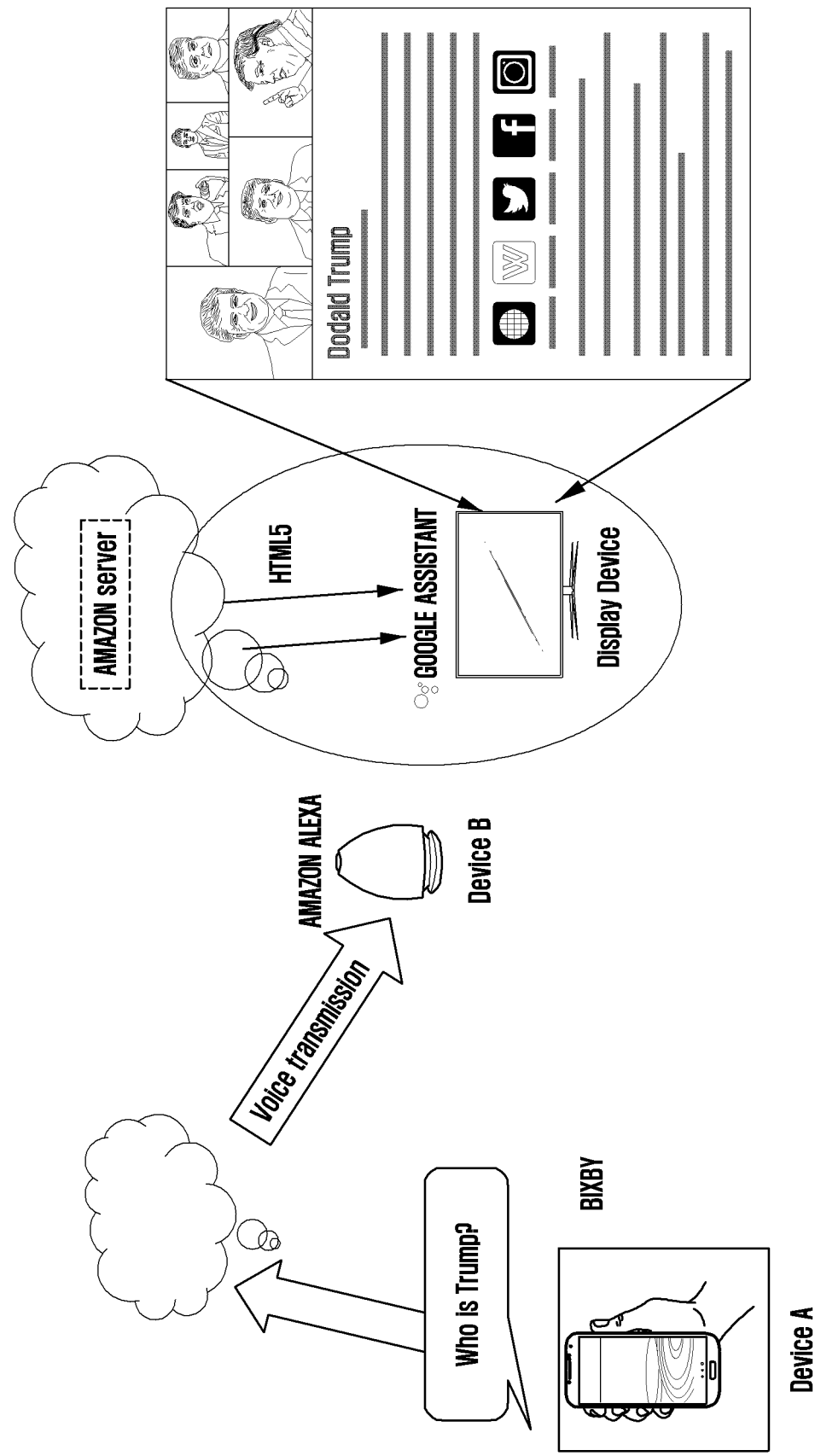
FIG. 12 is a schematic diagram illustrating an intelligence engine returning a result in the form of a web page, according to an embodiment.

The result returned by the intelligence engine may include, but is not limited to a webpage format such as Web/H5 or HTML5, a plain text format or music format, or a streaming media format. The above result may be sent, through data transmission, to the target output device terminal for displaying. An example of such a process relating to a voice command received at Device A, processed through an intelligence ending of Device B, and displayed at a Display Device, is illustrated in FIG. 12.

The intelligence engine may call an application of the cloud, such as a video application of the cloud, to return the result. Such a result may be notified by the intelligence engine to the target output device terminal to connect to the cloud server. The cloud server may receive a connection request from the device terminal client and returns multimedia information such as streaming media to the client to ensure smooth connection of a data channel and a control channel.

Figure 13:
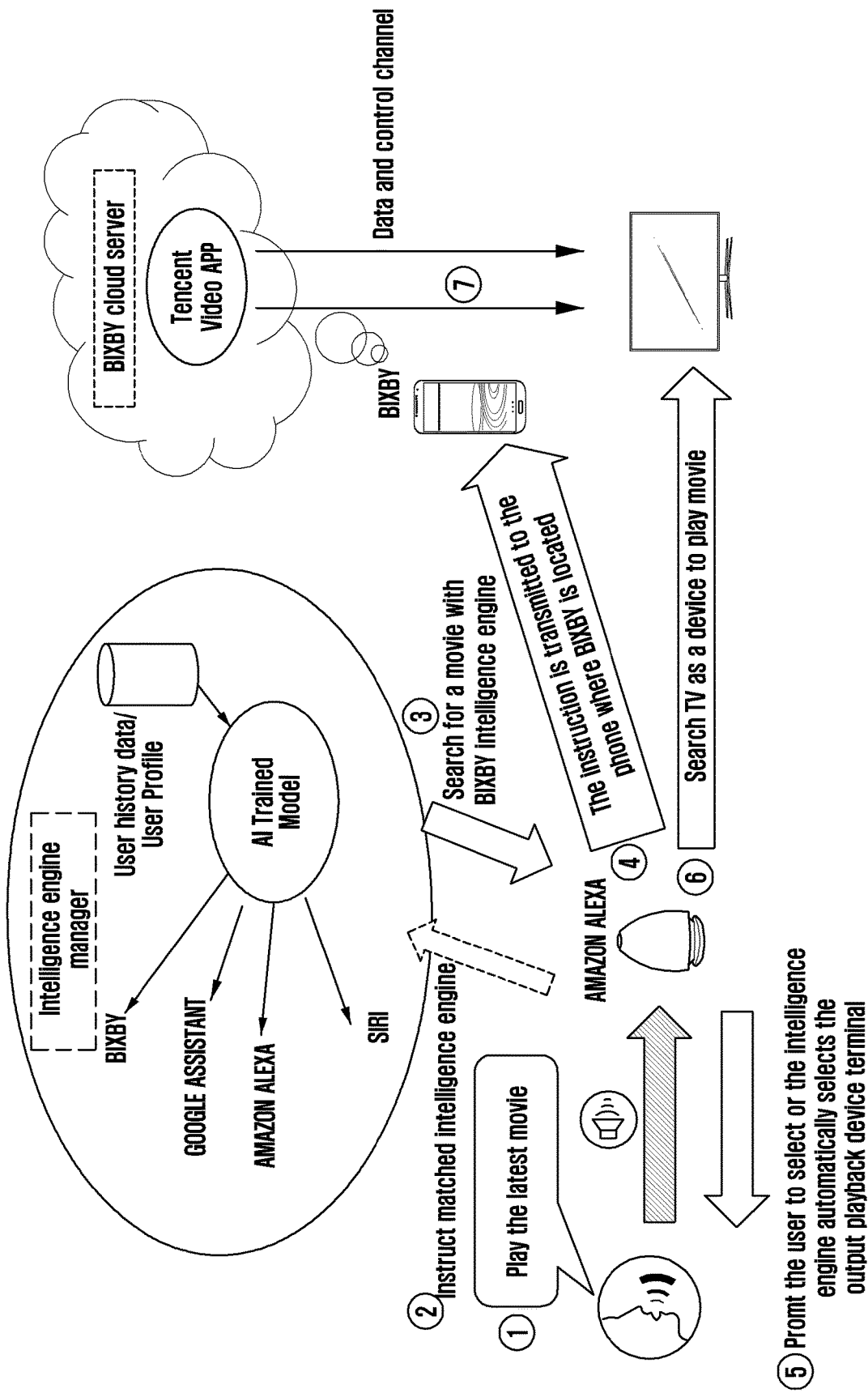
FIG. 13 is a schematic flowchart illustrating a scenario for playing a movie, according to an embodiment.

Hereinafter, a multi-device transmission and interaction process involved in the present disclosure is described taking playing a movie instructed by a user voice as an example. As shown in FIG. 13, the process includes:

At operation 1, a user searches for a movie, and an intelligence engine preferred by the user is BIXBY.

At operation 2, a receiving device is a smart speaker equipped with ALEXA. The receiving device transmits an instruction to a mobile phone equipped with the BIXBY intelligence engine through a data channel. A result output by the mobile phone is a TENCENT video cloud application at the BIXBY cloud.

At operation 3, the user does not choose to play on the mobile phone, but on a TV. Contents are on the BIXBY cloud server of the mobile phone, and a play end is on the TV.

At operation 4, the BIXBY cloud server enables a cloud video streaming media service, which transmits a streaming media URL to the TV via the smart speaker. The TV terminal opens a streaming media client program, connects to the streaming media address of the TENCENT video cloud application, and plays the video.

Several examples are given below to illustrate different implementations of the method for sharing an intelligence engine device provided by the present disclosure.

Example 1: a user issues an instruction after setting intelligence engine preference, and a selected intelligence engine device is in the smart home.

1) The preference setting of the intelligence engine is configured in advance, or an intelligence algorithm can be dynamically adjusted after a period of time;

2) The user issues the instruction. A device terminal that receives the instruction sends the instruction to a terminal to which a preferred intelligence engine belongs. A processed result is sent back to an initial device or a receiving device terminal specified by the user;

3) A final output device performs display or playback.

Example 2: a user issues an instruction after setting intelligence engine preference, and a selected intelligence engine device is not in the smart home.

1) The preference setting of the intelligence engine is configured in advance, or an intelligence algorithm can be dynamically adjusted after a period of time;

2) The user issues the instruction. A device terminal that receives the instruction searches for an intelligence engine according to a priority. The intelligence engine is not in the smart home environment. Therefore, an intelligence engine of the device that receives the instruction is used to process the instruction;

3) The device that receives the instruction performs display or playback.

Example 3: a user issues an instruction after setting intelligence engine preference, a selected intelligence engine device is in the smart home, and the user specifies a final output device.

1) The preference setting of the intelligence engine is configured in advance, or an intelligent algorithm can be dynamically adjusted after a period of time;

2) The user issues the instruction. A device terminal that receives the instruction searches for an intelligence engine according to a priority. After the intelligence engine is searched out, the device terminal that receives the instruction sends the instruction to a device terminal to which the preferred intelligence engine belongs. A processing result asks the user to select which device is the final output device;

3) After the user selects the output device, the processing result is finally displayed or played on the output device.

Example 4: a user issues an instruction after setting intelligence engine preference, a selected intelligence engine device is in the smart home, and the user does not specify a final output device.

1) The preference setting of the intelligence engine is configured in advance, or an intelligence algorithm can be dynamically adjusted after a period of time;

2) The user issues the instruction. A device terminal that receives the instruction searches for an intelligence engine according to a priority. After the intelligence engine is searched out, the device terminal that receives the instruction sends the instruction to a device terminal to which the preferred intelligence engine belongs. A processing result performs intelligent analysis according to previous user habit data, and selects a most suitable output device;

3) The processing result is finally displayed or played on the output device.

Example 5: a user issues an instruction after setting intelligence engine preference, and a first receiving device sends user PCM voice data to another device for processing.

1) The preference setting of the intelligence engine is configured in advance:

2) The user issues the instruction. A first device terminal that receives the instruction performs speech recognition and semantic understanding. After analyzing a priority of an intelligence engine corresponding to the user's intention, the instruction is required to be transmitted to another intelligence engine for processing;

3) The user PCM voice data is transmitted to another device;

4) An intelligence engine of the other device re-performs speech recognition and semantic understanding.

Example 6: a user issues an instruction after setting intelligence engine preference, and a first receiving device sends instruction data parsed by the first receiving device to another device for processing.

1) The preference setting of the intelligence engine is configured in advance;

2) The user issues the instruction. A first device terminal that receives the instruction performs speech recognition and semantic understanding. After analyzing a priority of an intelligence engine corresponding to the user's intention, the instruction is required to be transmitted to another intelligence engine for processing;

3) The instruction intent data that the first device has parsed is transmitted to another device;

4) An intelligence engine of the other device skips steps of speech recognition and semantic understanding, and directly executes the user instruction.

Example 7: when a user configures preference setting of "Type: Search Movie", a score of GOOGLE is 48 points, a score of BIXBY is 38 points, and a score of AMAZON ALEXA is 14. A first priority of the user is GOOGLE.

1) The preference setting of the intelligence engine is configured well;

2) The user issues a search movie instruction, BIXBY is selected for the search, and the user approves and uses a search result from BIXBY. BIXBY is rewarded with a preference score each time, and soon surpasses GOOGLE, which is previously the first priority;

3) The user continues to use BIXBY and the score of BIXBY rises to the first priority, which changes the original setting of the user. A customary choice of the user is recorded and the original priority is modified.

The above are examples of specific implementations of embodiments of the present disclosure. The present disclosure further provides a system for sharing an intelligence engine by multiple devices, including a cloud server and a plurality of IoT devices.

The cloud server may be configured to, when detecting that there is an IoT device connected, determine whether the IoT device is equipped with an intelligence engine, read and store a type of the intelligence engine in the IoT device when the intelligence engine is provided, obtain an online state of each connected IoT device, send the online state and an type of an intelligence engine of each connected IoT device to all IoT devices in the system, receive a search instruction sent from the IoT device, and perform type identification of the search instruction.

The IoT device may be configured to, when receiving the search instruction from a user, send the search instruction to the cloud server for identifying an instruction type of the search instruction, send, according to a correspondence between the instruction type of the search instruction and the type of the intelligence engine, the received search instruction to an online IoT device where an intelligence engine corresponding to the instruction type of the search instruction is located, and process a search instruction sent from another IoT device or the cloud server in an intelligence engine of the IoT device.

Specifically, in a smart home system, the cloud server may include an information obtaining unit, a type identifying unit, and a processing device determining unit. The cloud server may include a communication interface and at least one processor. The at least one processor may include functions and/or configurations of the information obtaining unit, the type identifying unit and the processing device determining unit. Accordingly, explanations of each element of the cloud server written below may be performed by the at least one processor of the cloud server.

The information obtaining unit may be configured to, when detecting that there is an IoT device connected, determine whether the IoT device is equipped with an intelligence engine, read and store a type of the intelligence engine in the IoT device when the intelligence engine is provided, obtain an online state of each connected IoT device. The type identifying unit may be configured to receive a search instruction sent from the IoT device, identify a type of the search instruction, and return the type of the search instruction to a corresponding IoT device. The processing device determining unit may be configured to store a correspondence between an instruction type and an intelligence engine type, determine an intelligence engine type corresponding to the instruction type identified by the type identifying unit, determine a processing device of the search instruction according to the determined intelligence engine type, and return the determined processing device to the IoT device sending the search instruction.

In order to obtain capability information, the cloud server may further include a capability information obtaining unit, which may be configured to acquire capability information of each connected IoT device, determine a correspondence between an instruction type and an output device according to the capability information, and store the correspondence between the instruction type and the output device in the processing device determining unit. After the capability information obtaining unit is added, the processing device determining unit may be configured to determine the processing device corresponding to the received search instruction according to the correspondence between the instruction type and the output device, and inform the IoT device sending the search instruction.

In order to update the correspondence between the instruction type and the intelligence engine type in real time, the cloud server may further include a correspondence updating unit, to increase a priority score of the intelligence engine type of the processing device according to a set step size after determining the processing device of the search instruction, and update the correspondence between the instruction type and the intelligence engine type in real time according to a priority of each intelligence engine type.

An IoT device in the smart home system may include a user interface unit, a server interface unit, and an intelligence engine unit.

The user interface unit may be configured to receive a search instruction input by a user. The server interface unit may be configured to send the search instruction to a cloud server of the system for identifying an instruction type of the search instruction, and send, according to processing device information returned by the cloud server, the search instruction to an intelligence engine unit of a processing device corresponding to the processing device information for search processing. The intelligence engine unit may be configured to process a search instruction received by the intelligence engine unit.

In order to perform subsequent processing on the search result at a suitable output device, the server interface unit may be further configured to receive output device information of the search instruction from the cloud server, and send the output device information and the search instruction to the intelligence engine unit of the processing device. The intelligence engine unit may be configured to send a search result of the intelligence engine unit to an output device corresponding to the output device information for subsequent processing.

In an embodiment, in order to perform subsequent processing on the search result at an output device specified by the user, the user interface unit may be configured to receive output device information specified by the user. The intelligence engine unit may be configured to send a search result of the intelligence engine unit to an output device corresponding to the output device information for subsequent processing.

Through the above processing of the present disclosure, based on different intelligence engines equipped in different devices in a smart home or in the same local area network, different user instruction types are preset in the user's preference setting and are processed by different intelligence engines, and a final processing result is returned to the user. Accordingly, intelligence engines in multiple devices may be shareable with each other, which breaks a limitation that a single device can only use its own intelligence engine. In view of characteristics and areas of expertise of each intelligence engine, the user may customize which intelligence engine is to process a specific instruction. After accumulating a certain amount of user habit data, an artificial intelligence algorithm may automatically calculate and reset a priority order of intelligence engines corresponding to instruction types. Ultimately, advantages of intelligence engines in multiple devices may be complemented with each other, the accuracy of the user instruction may be optimized, and the convenience of the user may be improved.

As is traditional in the field, embodiments may be described and illustrated in terms of units or modules which carry out a described function or functions. These units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a unit or module may be implemented by dedicated hardware, or by a processor (e.g., one or more programmed microprocessors and associated circuitry), or by a combination of dedicated hardware to perform some functions of the unit or module and a processor to perform other functions of the unit or module. Each unit or module of the embodiments may be physically separated into two or more interacting and discrete units or modules without departing from the scope of the invention. Likewise, the units or modules of the embodiments may be physically combined into more complex units or modules without departing from the scope of the invention.

The above are exemplary embodiments of the present disclosure, and are not used for limiting the present disclosure. Any modifications, equivalents, improvements, etc., made under the spirit and principle of the present disclosure should be included in the protected scope.

What is claimed is:

1. A cloud server comprising:
   a communication interface; and
   at least one processor configured to:
   detect a plurality of IoT devices connected to the cloud server from the communication interface,
   based on detecting the plurality of IoT devices connected to the cloud server, determine that the plurality of IoT devices are equipped with a corresponding plurality of intelligence engines,
   read and store a plurality of intelligence engine types of the plurality of intelligence engines,
   receive a search instruction sent from a receiving IoT device of the plurality of IoT devices, wherein the search instruction comprises a request for information received by the receiving IoT device from a user,
   identify an instruction type of the search instruction, and
   select an IoT device including intelligence engine to respond to the search instruction based on a correspondence between the instruction type and a preferred intelligence engine type stored in the cloud server.

2. The cloud server of claim 1, wherein the at least one processor is further configured to:
   acquire capability information of the plurality of IoT devices,
   determine a correspondence between an instruction type and an output device according to the capability information, and
   store the correspondence between the instruction type and the output device in a processing device determining unit.

3. The cloud server of claim 2, wherein the at least one processor is configured to:
   determine the selected IoT device corresponding to the received search instruction according to the correspondence, and
   inform the receiving IoT device.

4. The cloud server of claim 1, the at least one processor is further configured to:
   increase a priority score of the preferred intelligence engine type when the intelligence engine of the preferred intelligence engine type is selected by a user, and
   update the correspondence between the instruction type and the intelligence engine type in real time according to the priority score of the preferred intelligence engine type.

5. The cloud server of claim 4, wherein the instruction type corresponds to one or more of the intelligence engine types, and
   wherein the one or more of the intelligence engine types have different priorities.

6. The cloud server of claim 1, wherein based on the plurality of IoT devices including clients of a system, the plurality of intelligence engine types, the plurality of online states, and the capability information, are obtained using the client, and are registered at the cloud server.

7. The cloud server of claim 6, wherein based on the plurality of IoT devices not including the clients of the system, the at least one processor is further configured to:
   connect to the plurality of IoT devices through Bluetooth to obtain device names of the plurality of IoT devices, and
   search a preset correspondence table between the device names and the plurality of intelligence engine types and the capability information.

8. The cloud server of claim 1, wherein the received search instruction is sent directly to the selected IoT device, so that the first IoT device parses the received search instruction, or
   wherein the at least one processor is configured to parse the received search instruction before being sent to the selected IoT device.

9. The cloud server of claim 8, wherein based on the search instruction being voice data of a user, the at least one processor is configured to perform speech recognition and semantic understanding on the voice data of the user.

10. The cloud server of claim 1, wherein the received search instruction is sent to the selected IoT device through end-to-end transmission or through a smart system cloud used as an intermediary.

11. A method for sharing an intelligence engine performed by a cloud server, the method comprising:
    detecting a plurality of IoT devices connected to the cloud server;
    based on detecting the plurality of IoT devices connected to the cloud server, determining that the plurality of IoT devices are equipped with a corresponding plurality of intelligence engines,
    reading and storing a plurality of intelligence engine types of the plurality of intelligence engines,
    obtaining a plurality of online states of the plurality of IoT devices,
    receiving a search instruction sent from a receiving IoT device, wherein the search instruction comprises a request for information received by the receiving IoT device from a user,
    identifying an instruction type of the search instruction,
    returning the instruction type of the search instruction to a selected IoT device, and
    selecting an IoT device including intelligence engine to respond to the search instruction based on a correspondence between the instruction type and a preferred intelligence engine type stored in the cloud server.

12. The method of claim 11, further comprising:
    acquiring capability information of the plurality of IoT devices,
    determining a correspondence between an instruction type and an output device according to the capability information, and
    storing the correspondence between the instruction type and the output device in a processing device determining unit.

13. The method of claim 12, further comprising:
    determining the selected IoT device corresponding to the received search instruction according to the correspondence, and
    informing the receiving IoT device.

14. The method of claim 11, further comprising:
    increasing a priority score of the preferred intelligence engine type, when the intelligence engine of the preferred intelligence engine type is selected by a user, and
    updating the correspondence between the instruction type and the intelligence engine type in real time according to the priority score of the preferred intelligence engine type.

15. The method of claim 14, wherein the instruction type corresponds to one or more of the intelligence engine types, and
    wherein the one or more of the intelligence engine types have different priorities.

16. The method of claim 11, wherein the received search instruction is sent directly to the selected IoT device, so that the first IoT device parses the received search instruction, or
wherein the received search instruction is parsed before being sent to the selected IoT device.

17. The method of claim 16, wherein based on the search instruction being voice data of a user, the parsing of the received search instruction comprises performing speech recognition and semantic understanding on the voice data of the user.

18. An IoT device in a smart home system, the IoT device comprising:
 a user interface unit;
 a server interface unit; and
 an intelligence engine,
 wherein, the user interface unit is configured to receive a search instruction input by a user, wherein the search instruction comprises a request for information,
 wherein the server interface unit is configured to:
 send the search instruction to a cloud server of the smart home system for identifying an instruction type of the search instruction,
 receive processing device information returned by the cloud server, when the intelligence engine of the IoT device is selected to respond to the search instruction, and
 send the search instruction to the intelligence engine corresponding to the processing device information,
 wherein the intelligence engine is configured to process the search instruction.

19. The IoT device of claim 18, wherein, the server interface unit is further configured to receive output device information of the search instruction from the cloud server, and to send the output device information and the search instruction to a preferred intelligence engine of the processing device, and
 wherein the intelligence engine is configured to send a search result of the intelligence engine to an output device corresponding to the output device information for subsequent processing.

20. The IoT device of claim 18, wherein, the user interface unit is configured to receive output device information specified by the user, and
 wherein the intelligence engine is configured to send a search result of the intelligence engine to an output device corresponding to the output device information for subsequent processing.

* * * * *